MAGNETIC MEMORY ELEMENT HAVING INFORMATION CORE AND READOUT CORE

Original Filed March 31, 1964 4 Sheets-Sheet 1

INVENTORS
FRANK R. JANISCH
WILLIAM W. DAVIS

BY Thomas J. Nikolai
ATTORNEY

Feb. 16, 1971 F. R. JANISCH ET AL 3,564,516
MAGNETIC MEMORY ELEMENT HAVING INFORMATION
CORE AND READOUT CORE
Original Filed March 31, 1964 4 Sheets-Sheet 4

United States Patent Office 3,564,516
Patented Feb. 16, 1971

3,564,516

MAGNETIC MEMORY ELEMENT HAVING INFORMATION CORE AND READOUT CORE

Frank R. Janisch, Savage, and William W. Davis, Minneapolis, Minn., assignors to Sperry Rand Corporation, New York, N.Y., a corporation of Delaware Continuation of application Ser. No. 356,165, Mar. 31, 1964. This application Apr. 5, 1968, Ser. No. 722,815
Int. Cl. G11c *5/02, 11/14*
U.S. Cl. 340—174 9 Claims

ABSTRACT OF THE DISCLOSURE

A memory element comprising two open-flux-path thin-ferromagnetic-film layers having approximately the same physical dimensions, material composition and magnetic characteristics, termed the information core and the readout core, each having uniaxial anisotropy for providing parallel easy axes. A first embodiment utilizes coincident longitudinal and transverse write drive fields to align the magnetization of the information core and the readout core in a parallel relationship; a subsequent transverse set drive field switches the magnetization of the readout core causing it to align itself anti-parallel that of the information core whereas each core partially closes the otherwise open flux path of the other. A second embodiment utilizes coincident longitudinal and transverse write drive fields of relatively long duration and of gently sloping leading and trailing edges to align the magnetization of the cores anti-parallel each other.

CROSS-REFERENCE TO RELATED APPLICATION

The invention herein described was made in the course of or under a contract or subcontract thereunder with the Department of the Navy, and is a continuation application of our parent application Ser. No. 356,165, filed Mar. 31, 1964, now abandoned.

BACKGROUND OF THE INVENTION

The value of the utilization of small cores of magnetizable material as logical memory elements in electronic data processing systems is well known. This value is based upon the bistable characteristics of magnetizable cores which include the ability to retain or remember magnetic conditions which may be utilized to indicate a binary "1" or a binary "0." As the use of magnetizable cores in electronic data processing equipment increases, a primary means of improving the computational speed of these machines is to utilize memory elements that possess the property of nondestructive readout, for by retaining the initial state of remanent magnetization after readout the rewrite cycle required with destructive readout devices is eliminated. As used herein, the term "nondestructive readout" shall refer to the sensing of the relative directional-state of the remanent magnetization of a magnetizable core without destroying or reversing such remanent magnetization. This should not be interpreted to mean that the state of the remanent magnetization of the core being sensed is not temporarily disturbed during such nondestructive readout.

Ordinary magnetizable cores and circuits utilized in destructive readout devices are now so well known that they need no special description herein. However, for purposes of the present invention, it should be understood that such magnetizable cores are capable of being magnetized to saturation in either of two directions. Furthermore, these cores are formed of magnetizable material selected to have a rectangular hysteresis characteristic which assures that after the core has been saturated in either direction a definite point of magnetic remanence representing the residual flux density in the core will be retained. The term "flux density" when used herein shall refer to the net external magnetic effect of a given internal magnetic state; e.g., the flux density of a demagnetized state shall be considered to be a zero or minimum flux density while that of a saturated state shall be considered to be a maximum flux density of a positive or negative magnetic sense. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1," to the other magnetic state corresponding to the opposite direction of saturation, i.e., negative saturation, denoting a binary "0." One or more output coils are usually provided to sense when the core switches from one state of saturation to the other. Switching can be achieved by passing a current pulse of sufficient amplitude through the input winding in a manner so as to set up a magnetic field in the area of the magnetizable core in a sense opposite to the pre-existing flux direction, thereby driving the core to saturation in the opposite direction of polarity, i.e., of positive to negative saturation. When the core switches, the resulting magnetic field variation induces a signal in the windings on the core such as, for example, the above mentioned output or sense winding. The material for the core may be formed of various magnetizable materials. The terms "signal," pulse," etc., when used herein shall be used interchangeably to refer to the current signal that produces the corresponding magnetic field and to the magnetic field produced by the corresponding current signal.

One technique of achieving destructive readout of a toroidal bistable memory core is that of the well-known coincident current technique. This method utilizes the switching threshold characteristic of a core having a substantially rectangular hysteresis characteristic. In this technique, a minimum of two interrogate, or read, lines thread the core's central aperture, each interrogate line setting up a magnetomotive force in the memory core of one half of the magnetomotive force necessary to completely switch the memory core from a first to a second and opposite magnetic state while the magnetomotive force set up by each separate interrogate winding is of insufficient magnitude to effect a substantial change in the memory core's magnetic state. A sense winding threads the core's central aperture and detects the memory core's substantial or insubstantial magnetic state change as an indication of the information stored therein.

One technique of achieving nondestructive readout of a magnetic memory core is that disclosed in the article "Nondestructive Sensing of Magnetic Cores," Transactions of the AIEE, Communications on Electronics, Buck and Frank, January 1954, pp. 822–830. This method utilizes a bistable magnetizable toroidal memory core having write and sense windings which thread the central aperture with a transverse interrogate field, i.e., an externally applied field directed across the core's internal flux, applied by a second low remanent-magnetization magnetic toroidal core having a gap in its flux path into which one leg of the memory core is placed. Application of an interrogate current signal on the interrogate winding threading the interrogate core's central aperture sets up a magnetic field in the gap which is believed to cause a temporary rotation of the flux of the memory core in the area of the interrogate core's air gap. This temporary alteration of the memory core's remanent magnetic state is detected by the sense winding, the polarity of the output signal indicative of the information stored in the memory core.

Another technique of achieving nondestructive readout of a magnetic memory core is that disclosed in the article "The Transfluxor" Rajchman and Lo, Proceedings of the IRE, March 1956, pp. 321–332. This method utilizes a "transfluxor" which comprises a core of magnetizable material of a substantially rectangular hysteresis characteristic having at least a first large aperture and a second small aperture therethrough. These apertures form three flux paths; the first defined by the periphery of the first aperture, a second defined by a periphery of the second aperture, and a third defined by the flux path about both peripheries. Information is stored in the magnetic sense of the flux in path 1 with nondestructive readout of the information stored in path 1 achieved by coupling an interrogate current signal to an interrogate winding threading aperture 2 with readout of the stored information achieved by a substantial or insubstantial change of the magnetic state of path 2. Interrogation of the transfluxor as disclosed in the above article requires an unconditional reset current signal to be coupled to path 2 to restore the magnetic state of path 2 to its previous state if switched by the interrogate current signal.

A still further technique of achieving nondestructive readout of a magnetic memory core is that disclosed in the article "Fluxlock-High Speed Core Memory" Instruments and Control Systems, Robert M. Tillman, May 1961, pp. 866–869. This method utilizes a bistable magnetic torodial memory core having write and sense windings threading the core's central aperture and an interrogate winding wound about the core along a diameter thereof. Information is stored in the core in the conventional manner. Interrogation is achieved by coupling an interrogate current signal to the interrogate winding causing a temporary alteration of the core's magnetic state. Readout of the stored information is achieved by a bipolar output signal induced in the sense winding, the polarity-phase of the readout signal indicating the information stored therein.

A still further technique of achieving nondestructive readout of a magnetizable memory core is that disclosed in the article of "Coincident-Current Non-Destructive Readout from Thin Magnetic Films," Oakland and Rossing, Journal of Applied Physics, Supplement, vol. 30, No. 4, pp. 54S–55S, Apr. 1, 1959. This method utilizes a Bicore memory element comprising two open flux path cores of thin ferromagnetic material and are described as having single-domain properties. The term "single-domain property" may be considered the characteristic of a three-dimensional element of magnetizable material having a thin dimension that is substantially less than the width and length thereof wherein no magnetic domain walls can exist parallel to the large surface of the element. The Bicore element cores are designated the information core and the readout core. Both of these cores preferably exhibit single-domain properties providing single-domain rotational switching and possess the characteristics of uniaxial anisotropy so as to provide a magnetic "easy" axis along which the cores' remanent magnetization vectors shall reside when the external magnetizing force in the area of the cores is substantially zero.

The information core of the Bicore element is the core in which data is stored as a binary "1" or a "0," which binary "1" or "0" is denoted by the remanent magnetization vector thereof having a magnetic sense arbitrarily designated as being in the positive or negative state. The information core is preferably of such geometry and material that it exhibits coercivity substantially greater than that of the readout core. The readout core of the Bicore element is the core that is either switched, or not switched, by an interrogating pulse depending upon the data stored in the information core. Thus, the switching on non-switching of the readout core is indicative of the binary data stored in the information core. The information core further provides an external remanent magnetic field substantially larger than that of the readout core such that the readout core is coerced by the information core's external remanent magnetic field to follow the magnetic state of the information core. The relative coercivities of these two cores are such that an interrogating pulse sets up a substantial magnetic field in the area of the readout core which switches the magnetization of the readout core but sets up an insubstantial magnetic field in the area of the information core which does not switch the magnetization of the information core. The term "switch" when used herein means driving the magnetic state of the core concerned from a point along the substantially horizontal portion of its hysteresis characteristic loop to a point substantially into its high permeability area or into its opposite state of magnetization, i.e., from positive or negative saturation.

The arrangement of these two cores is such that in the area of the readout core the magnetic fields set up by the interrogating pulse is additive to or subtractive from the external remanent magnetic field set up by the information core. If in the area of the readout core the external remanent magnetic field set up by the information core is additive to the magnetic field set up by the interrogating pulse, the readout core is merely driven further into saturation and a consequent change in magnetic field thereabout is negligible. This driving of the readout core's magnetic state further into saturation with resulting negligible change in magnetic field thereabout results in a negligible output signal being developed in a coupled sense line. Conversely, if in the area of the readout core the external remanent magnetic field set up by the information core is subtractive from the magnetic field set up by the interrogating pulse, the magnetic field set up by the interrogating pulse having a substantially greater effect on the readout core than the external remanent magnetic field of the information core, the readout core's magnetization vector is driven from its positive remanent magnetic state and reversed into its negative remanent magnetic state. Upon cessation of the interrogating pulse, the effect of the external remanent magnetic field set up by the information core in the area of the readout core again takes effect and returns the readout core's magnetization vector to its initial positive remanent magnetic state associated with a stored binary "1" in the information core. The driving or switching of the readout core's magnetization vector from a first magnetic state to a second magnetic state and the consequent substantial change in magnetic field thereabout results in a relatively large output signal being developed in a coupled sense line. The A. V. Pohn et al. Pat. Nos. 3,015,807 and 3,125,743 disclose the above described Bicore element utilizing longitudinal and transverse core axes and drive field relationships.

SUMMARY OF THE INVENTION

The present invention is an improvement of the above described Bicore element which in its preferred embodiment comprises two open flux path cores of thin ferromagnetic material having single-domain properties. The memory device of the present invention also utilizes two cores designated the information core and the readout core with both of these cores preferably exhibiting single-domain properties providing single-domain rotational switching and possessing the characteristic of uniaxial anisotropy so as to provide a magnetic "easy" axis along which the core's remanent magnetization vector shall reside when the external magnetizing force in the area of the core is substantially zero. However, whereas in the above described Bicore element the information core and the readout core have substantially different coercivities and external remanent magnetic field intensities coacting upon each other, the preferred embodiment of the memory element of the present invention utilizes an information core and a readout core that have approximately the same physical dimensions, material composition and magnetic characteristics.

Each of the cores of the present invention may be composed of a plurality of discrete layers, each layer preferably possessing the characteristics described above. Thus, each multi-layered core would provide the desired operating characteristics. As an example, in the preferred embodiment utilizing cores capable of exhibiting single-domain properties the thickness of such cores is limited to a narrow range. As the thickness determines the cross-sectional area and thus the total flux—assuming a constant flux density in the core—a greater total flux may be provided by a multi-layered core while yet retaining single-domain properties.

Nondestructive readout is achieved by the novel orientation of the drive lines and/or a ground plane whereby the interrogating, or read, field is relatively ineffective as regards the magnetic state of the information core but substantially effective as regards the magnetic state of the readout core. Write-in is achieved by a first drive field that sets the remanent magnetic state of the information core into the desired binary "1" or "0" state denoted by the remnant magnetization vector thereof having a magnetic sense arbitrarily designated as being in the positive or negative state. In the preferred embodiment a second drive field that is particularly effective as regards the readout core's remanent magnetization vector is applied transverse to the easy axis of the readout core causing the readout core's remanent magnetization vector, as biased by the external remanent magnetic field of the information core, to reverse itself, or switch, causing it to align itself anti-parallel to that of the information core when the transverse field is removed whereby the information core and the readout core form high permeability return flux paths for each other's external remanent magnetic field. Nondestructive readout is then provided by a read field that is particularly effective as regards the readout core's remanent magnetization vector and transverse thereto which field causes only a partial rotation—non-switching—of such vector. The clockwise, or counterclockwise, direction of rotation of such vector induces a signal in a sense line inductively coupled thereto which signal has a polarity that is indicative of the information state of the information core.

By providing a two core memory element each core of which is of approximately the same physical dimensions, material composition and magnetic characteristics there is provided a nondestructive readout memory element that is simple to fabricate by a vapor deposition process such as disclosed in the Rubens et al. Pat. No. 2,900,282 and which may be assembled and operated as multi-element devices as disclosed in the Rubens et al. Pat: No. 3,030,612. Additionally, by the use of low coercive force materials, such as Permalloy, as the constituent ferromagnetic material for both cores much lower drive fields may be utilized than in the above discussed Bicore element.

Accordingly, it is a primary objective of the present invention to provide an improved apparatus for permitting the nondestructive readout of a magnetic memory element including two open-flux-path thin-ferromagnetic-film layers having approximately the same physical dimensions, material composition and magnetic characteristics.

Another object of the invention is to provide a two-core magnetic memory apparatus, each core having substantially similar coercivities and external remanent magnetic field intensities.

Another object of this invention is to provide a magnetic memory apparatus comprising two magnetic film cores wherein the external remanent magnetic field of a first core magnetically biases a second core.

Still another object of this invention is the provision in a two-core memory apparatus of an interrogating magnetic fied that only partially rotates the magnetization vector of one of said cores in a first or second direction as a function of the remanent magnetic state of said first core.

It is a further object of this invention to provide a magnetic memory apparatus that exhibits nondestructive readout and which requires only the usual windings of a magnetic memory system.

DESCRIPTION OF THE PREFERRED EMBODIMENTS

Figure 1:
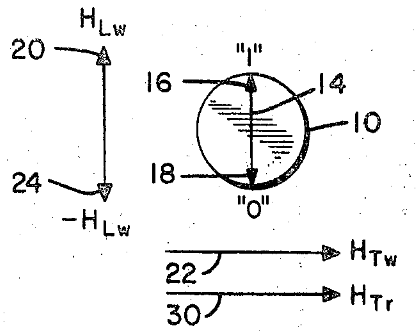
FIG. 1 is an illustration of the orientation of the drive fields in the planes of the cores with respect to the easy axes thereof.
Figure 2:
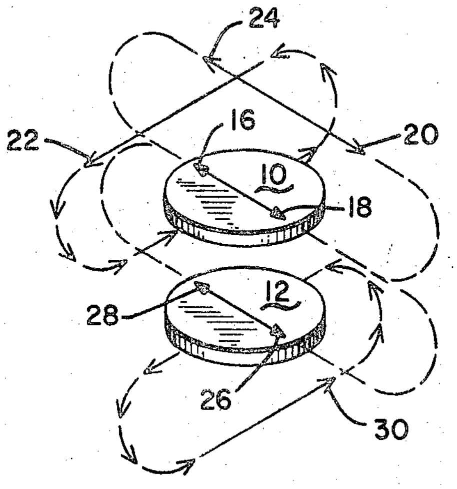
FIG. 2 is a trimetric illustration of the orientation of the drive fields with respect to the easy axes of the cores.

With particular reference to FIGS. 1 and 2 there is disclosed the orientation of the drive fields in the planes of the cores with respect to the easy axes of the associated information core 10 and readout core 12. Such cores, in the preferred embodiment, are thin films of ferromagnetic material exhibiting single-domain properties and possessing the characteristic of uniaxial anisotropy so as to provide a magnetic easy axis along which each core's remanent magnetization vector will reside. In the operation of the present invention the remanent magnetization vector along the easy axis 14 (see FIG. 1) of information core 10 can reside in either one of two directions represented by vector directions 16 or 18 designating a stored "1" or "0," respectively. The application of coincident longitudinal $H_{LW}$ and transverse $H_{TW}$ write fields—both with respect to the easy axis 14—set the remanent magnetization of information core 10 into the "1" or "0" state depending upon the direction of the longitudinal write field. The term "coincident" fields as used herein shall not be construed to imply that both the leading and trailing edges of such fields are coincident in time, but that at least a portion of such fields are concurrent, or overlapping, in time. Consequently, it is implied that such fields do have portions that overlap in time with the preferred embodiment utilizing a transverse write field that is applied before the application of the longitudinal write field and that is removed before the removal of the longitudinal write field. As an example, to set core 10 into a stored "1" a "positive" longitudinal write field 20, $H_{LW}$, is applied thereto coincident with the application of a transverse write field 22, $H_{TW}$. Conversely, to set core 10 into a stored "0" a "negative" longitudinal write field 24, $-H_{LW}$, is applied thereto coincident with the application of the transverse write field 22, $H_{TW}$.

As the memory element of the preferred embodiment of the present invention includes at least two cores—designated the information core and the readout core—of approximately the same physical dimensions, material composition and magnetic characteristics which are inductively coupled to each other by their external remanent magnetic fields, the write-in operation may or may not affect the readout core's magnetic state. However, for purposes of the present discussion assume that the magnetic state of the readout core after the write-in operation is such that its magnetization is aligned with the external remanent magnetic field of the information core in the area of the readout core. In this condition the readout core's magnetization is stated as being anti-parallel to that of the information core forming a partially closed flux path for the otherwise open flux path of the information core's external remanent magnetic field. To better describe such operation the trimetric illustration of FIG. 2 is presented showing the spatial relationship of such drive fields and cores. As described above longitudinal write field 20 sets the magnetization of information core 10 into the stored "1" state of vector 16 while longitudinal write field 24 sets the magnetization of information core 10 into the stored "0" state of vector 18. The magnetization of readout core 12, after the write-in operation and as assumed above, is aligned anti-parallel that of the information core 10 taking the corresponding direction of the magnetization of information core 10. As an example, with the magnetization of information core 10 set into the "1" state of vector 16 the magnetization of the readout core 12 is set into the corresponding "1" state of vector 26 while with the magnetization of information core 10 set into the "0" state of vector 18 the magnetization of the readout core 12 is set into the corresponding "0" state of vector 28.

Readout is accomplished by the application of a transverse read field 30, $H_{Tr}$, to readout core 12 which only partially rotates—non-switches—the magnetization vector 26 or 28 in a clockwise or counterclockwise direction inducing in a sense line inductively coupled thereto an output signal the polarity of which is indicative of the information state of the interrogated core as being a "1" or a "0." The above write-in and readout systems are well known to those of ordinary skill in the art and in particular are more fully discussed in Pat. Nos. 3,030,612 and 3,092,812. In the following discussions of the various embodiments of the present invention the above discussed operation is common thereto. However, due to the common magnetic characteristics of both cores 10 and 12 in the preferred embodiments it is apparent that neither core can coerce, by a relatively intense external remanent magnetic field as regards one core in the area of the other core, the magnetization of the other core into alignment therewith. Thus, after the completion of the write-in operation the magnetization of the information core and the readout core may be parallel—neither one partially closing the otherwise open flux path of the other. In this event a transverse set field, which may be similar to the transverse read field, is effectively applied only to the readout core. The application of the transverse set field along with the biasing effect of the external remanent magnetic field of the information core in the area of the readout core causes the magnetization of the readout core to align itself with the external remanent magnetic field of the information core in the area of the readout core—i.e., become anti-parallel thereto.

Figures 3, 5:
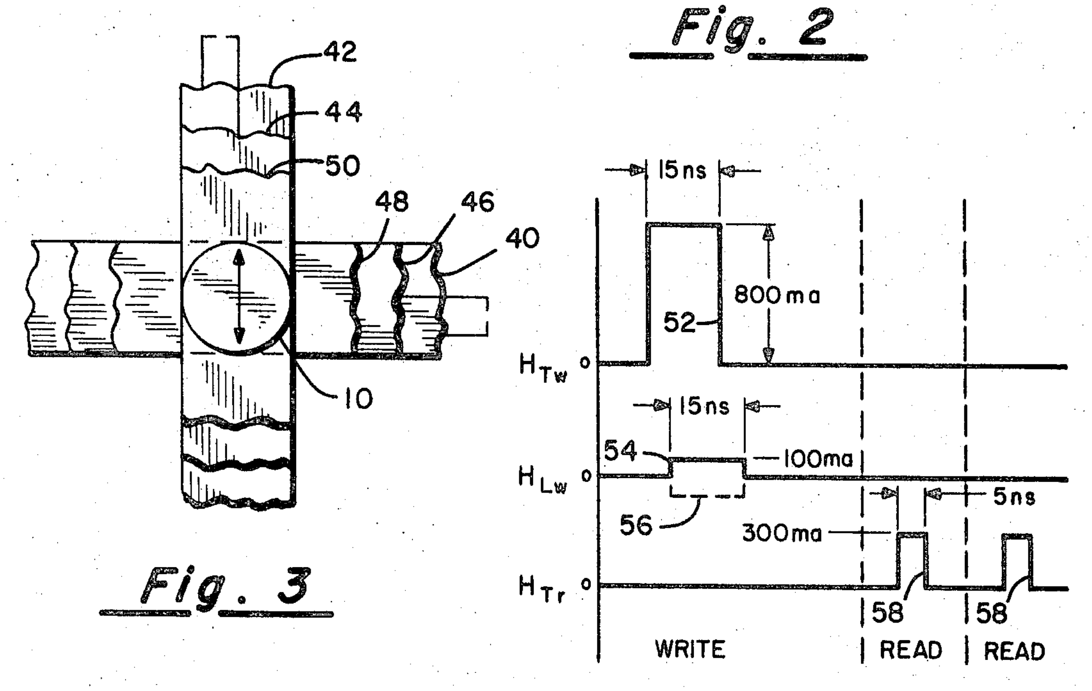
FIG. 3 is an illustration of a plan view of a first embodiment of the present invention.
FIG. 5 is an illustration of the control signals associated with the embodiment of FIG. 3.
Figure 4:
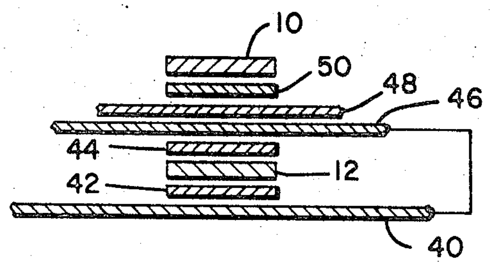
FIG. 4 is an illustration of a cross-section view of the embodiment of FIG. 3.

With particular reference to FIGS. 3, 4 and 5 there is disclosed a first preferred embodiment of the present invention. In this embodiment information core 10 is external to the drive circuitry with the following elements assembled in a stacked, superposed, sandwich array with suitable insulators—not illustrated for clarity—therebetween: sense line 40; transverse read line 42; readout core 12; transverse read line 44; sense line 46; longitudinal write line 48; transverse write line 50; and information core 10. Cores 10 and 12 are oriented with their easy axes parallel; sense lines 40 and 46 and longitudinal write line 48 are oriented with their magnetic axes parallel to each other and to said easy axes; transverse read lines 42 and 44 and transverse write line 50 are oriented with their magnetic axes parallel, i.e., the magnetic axis of a line is orthogonal to its physical axis or length, to each other and orthogonal to said easy axes.

For the write-in operation pulse 52 is initially coupled to transverse write line 50 followed by the coincident coupling of pulse 54 for the writing of a "1" or pulse 56 for the writing of a "0" to longitudinal write line 48. With particular reference to FIG. 5 (and subsequent FIGS. 10, 13 and 16) the control signals noted are exemplary values, not to be implied limitations. In these control signal values the abbreviations used have the following meanings: ma., milliamperes; ns., nanoseconds. These coincident write fields interact in the areas of the information core 10 and the readout core 12 to set the magnetization of information core 10 and readout core 12 in an anti-parallel relationship causing each to form a partially closed flux path for the external remanent magnetization of the other.

For the readout operation pulse 58 is coupled to serially coupled read lines 42 and 44 which sets up additive fields in the area of readout core 12 and subtractive fields in the area of information core 10. Consequently, the magnetization of readout core 12 is only partially rotated inducing a signal in the serially intercoupled sense lines 40 and 46 whose polarity is indicative of the information state of information core 10; while the magnetization of information core 10 is substantially unaffected thereby. After cessation of the readout pulse 58, the external remanent magnetic field of the information core 10 in the area of the readout core 12 causes the magnetization of the readout core 12 to align itself anti-parallel to the magnetization of the information core 10. Thus, there is provided nondestructive readout of the information stored in information core 10 by the temporary alteration of the magnetization of readout core 12.

Figures 6, 7, 8, 9, 10:
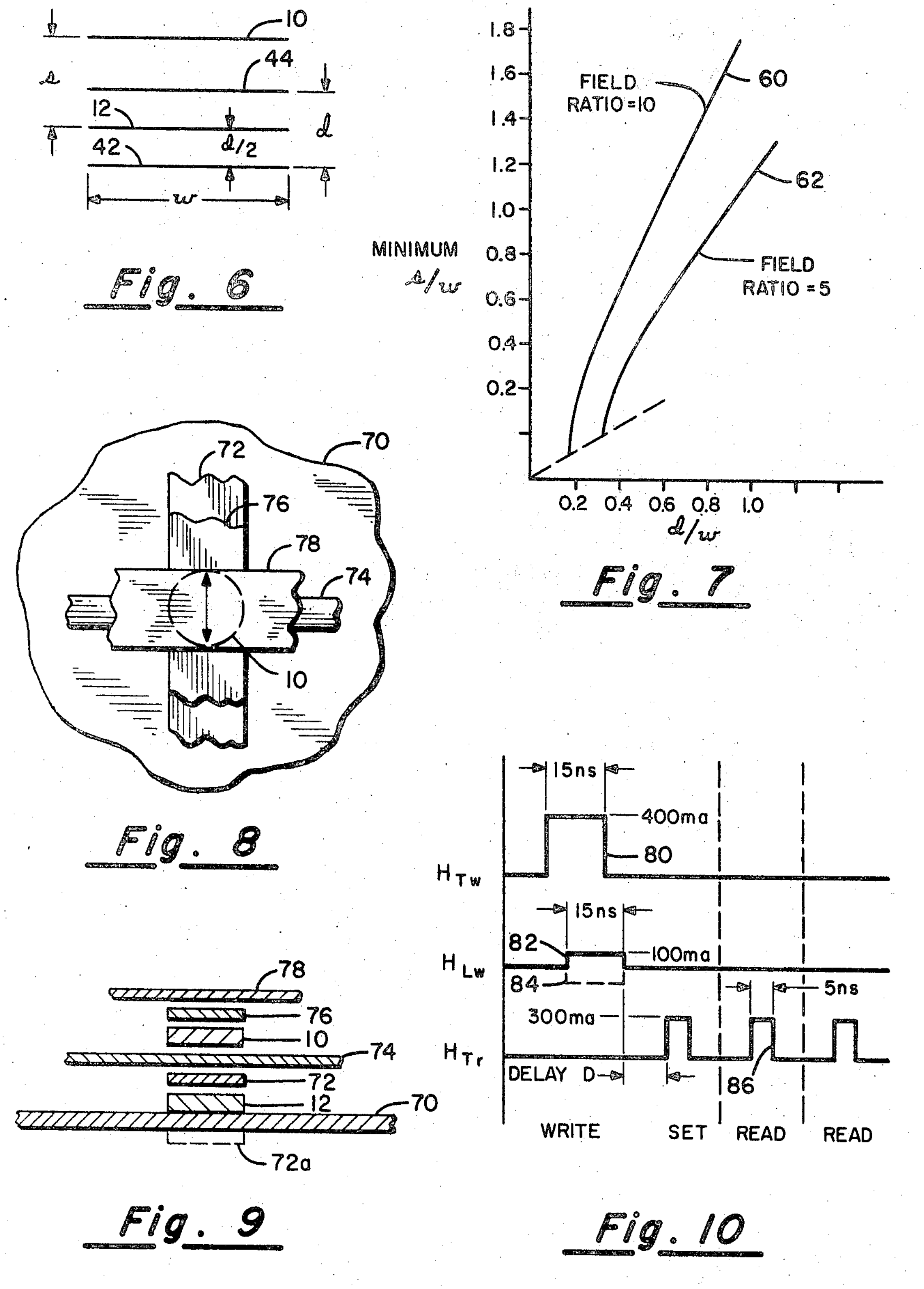
FIG. 6 is an illustration of the stacked, superposed, spatial relationship of the cores and read lines of the embodiment of FIG. 3.
FIG. 7 is a plot of the minimum separation between the cores of FIG. 6 for two ratios of read field intensities in the area of the readout core with respect to that in the area of the information core.
FIG. 8 is an illustration of a plan view of a second embodiment of the present invention.
FIG. 9 is an illustration of a cross-section view of the embodiment of FIG. 8.
FIG. 10 is an illustration of the control signals associated with the embodiment of FIG. 8.

With particular reference to FIGS. 6 and 7 there is illustrated the calculated spatial relationship of the read lines and the cores of FIGS. 3 and 4. For the specific read field ratios 10 and 5 of the maximum read field intensities in the area of the readout core as compared to that in the area of the information core calculated curves 60 and 62 of FIGS. 6 and 7 are presented. These curves illustrate that the minimum ratio $s/w$, where:

$s$=separation between cores
$w$=width of the read lines and the cores is determined by the ratio $d/w$ where:

$d$=separation betwen the read lines
$w$=width of the read lines and the cores.

This indicates that the cores necessary for the speed of operation desired for a high speed memory array will require very thin substrates and very thin films vapor deposited upon a ground plane. In the preferred embodiments of the present invention cores 10 and 12 are elements of 81.5% Ni-18.5% Fe vapor deposited upon 0.0030 inch thick glass substrates and of approximately 500 angstroms (A.) in thickness and 0.015 inch in diameter. Drive lines are printed circuit type conductors of 0.000125 inch thick copper with insulators formed of 0.00025 inch thick Mylar sheet. Where utilized, ground planes are of an electrical conducting sheet of minimum thickness for structural support with the cores vapor deposited upon a minimum thickness SiO insulator.

With particular reference to FIGS. 8, 9 and 10 there is disclosed a second preferred embodiment of the present invention. In this embodiment information core 10 is internal to the drive circuitry with the following elements assembled in a stacked, superposed, sandwich array with suitable insulators—not illustrated for clarity—inbetween: ground plane 70, readout core 12, transverse read line 72, sense 74, information core 10, transverse write line 76, and longitudinal write line 78. Cores 10 and 12 are oriented with their easy axes parallel; sense line 74 and longitudinal write line 78 are oriented with their magnetic axes parallel to each other and to said easy axes; transverse read line 72 and transverse write line 76 are oriented with their magnetic axes parallel to each other and orthogonal to said easy axes. In this arrangement only one read line 72 is utilized. However, an image conductor 72*a* of read line 72 is utilized to provide a means of calculating the coupling effect of the current coupled to the single read line 72. This arrangement provides, in effect, serially coupled read lines 72 nad 72*a* similiar to lines 42 and 44 of FIG. 4.

For the write-in operation pulse 80 is initially to transverse write line 76 followed by the coincident coupling of pulse 82 for the writing of a "1" or pulse 84 for the writing of a "0" to longitudinal write line 78. These coincident write fields interact in the areas of information core 10 and readout core 12 to set the magnetization of the information and the readout cores in a parallel relationship causing neither core to form a partially closed flux path for the external remanent magnetization of the other core. As the magnetization of the information core and the readout core are in a parallel relationship, it is necessary that a set field be applied to the readout core 12 which when coincident with the external remanent magnetic field of the information core in the area of the readout core causes the magnetization of the readout core to switch into an anti-parallel relationship with the magnetization of the information core. Consequently in this operation the write operation requires a further "set" pulse 85 which is coupled after a suitable delay time D to transverse read line 72 which coincident with the external remanent magnetic field of the information core in the area of the readout core causes the magnetization of the readout core to rotate into alignment with the external remanent magnetic field of the information core in the area of the readout core causing the magnetizations of the two cores to be in an anti-parallel relationship. This delay time D is such that the external remanent magnetic fields of the cores are not permitted to substantially enter, or "soak" through, ground plane 70 by the decay of the resisting eddy currents induced in the ground plane by such fields.

For the readout operation pulse 86 is coupled to read line 72 which in combination with its image conductor 72*a* sets up additive fields in the area of readout core 12 and substractive fields in the area of information core 10. Consequently, the magnetization of the readout core is partially rotated inducing an output signal in the sense line 74 whose polarity is indicative of the information state of information core 10 while the magnetization of information core 10 is unaffected thereby. Thus, as in the embodiment of FIG. 4, there is provided nondestructive readout of the information stored in information core 10 by the temporary alteration of the magnetization of readout core 12.

Figure 11:
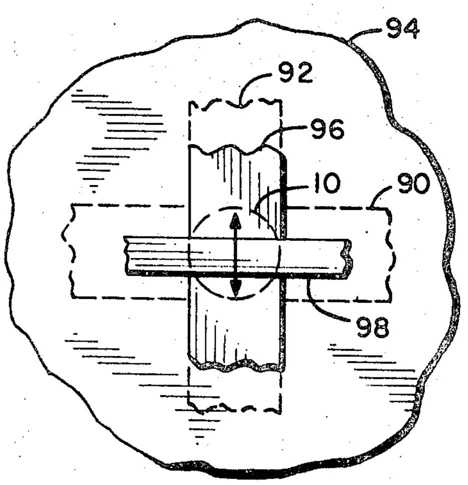
FIG. 11 is an illustration of a plan view of a third embodiment of the present invention.
Figure 12:
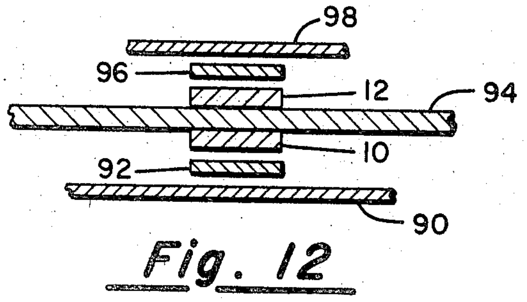
FIG. 12 is an illustration of a cross-section view of the embodiment of FIG. 11.
Figure 13:
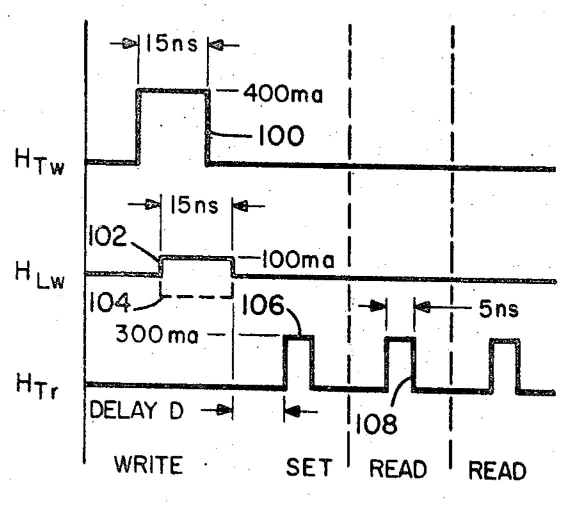
FIG. 13 is an illustration of the control signals associated with the embodiment of FIG. 11.

With particular reference to FIGS. 11, 12 and 13 there is disclosed a third preferred embodiment of the present invention. In this embodiment information core 10 and readout core 12 are internal to the drive circuitry with the following elements assembled in a stacked, superposed sandwich array with suitable insulators—not illustrated for clarity—therebetween: longitudinal write line 90, transverse write line 92, information core 10, ground plane 94, readout core 12, transverse read line 96, and sense line 98. Cores 10 and 12 are oriented with their easy axes parallel; longitudinal write line 90 and sense line 98 are oriented with their magnetic axes parallel to each other and to said easy axes; transverse write line 92 and transverse read line 96 are oriented with their magnetic axes parallel to each other and orthogonal to said easy axes. In this arrangement information core 10 and readout core 12 are desposited on opposing surfaces of ground plane 94 affecting a relative magnetic isolation therebetween.

For the write-in operation pulse 100 is initially coupled to transverse write line 92 followed by the coincident coupling of pulse 102 for the writing of "1" or pulse 104 for the writing of a "0" to longitudinal write line 90. These coincident write fields interact in the area of information core 10 to set the magnetization of the information core into the proper orientation. After a suitable delay time D to allow the flux of the write fields and information core 10 to "soak" through the ground plane 94 so as to become effective in the area of readout core 12 a set pulse 106 is coupled to read line 96. Pulse 106 sets up a set field in the area of readout core 12, which core is biased by the external remanent magnetic field of information core 10, causing the magnetization of readout core 12 to rotate into an anti-parallel relationship with the magnetization of information core 10. Each core then forms a partially closed flux path for the external remanent magnetization of the other.

For the readout operation pulse 108 is coupled to read line 96 which sets up a proper read field in the area of the readout core 12 which read field is isolated from information core 10 by the shielding effect of ground plane 94. The read field causes the magnetization of readout core 12 to be partially rotated inducing an output signal in sense line 98 whose polarity is indicative of the information state of information core 10 while the magnetization of information core 10 is unaffected thereby. Thus, as in the previous embodiments of FIGS. 4 and 9 there is provided nondestructive readout of the information stored in information core 10 by the temporary alteration of the magnetization of readout core 12.

Figure 14:
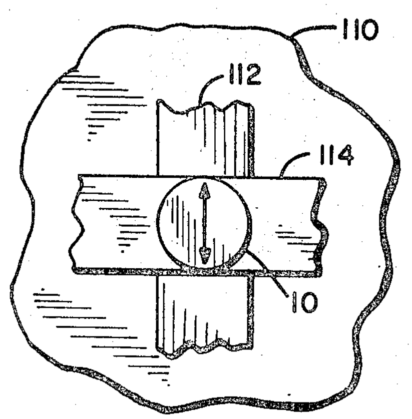
FIG. 14 is an illustration of a plan view of a fourth embodiment of the present invention.
Figure 15:
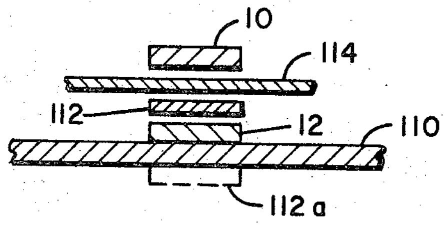
FIG. 15 is an illustration of a cross-section view of the embodiment of FIG. 14.
Figure 16:
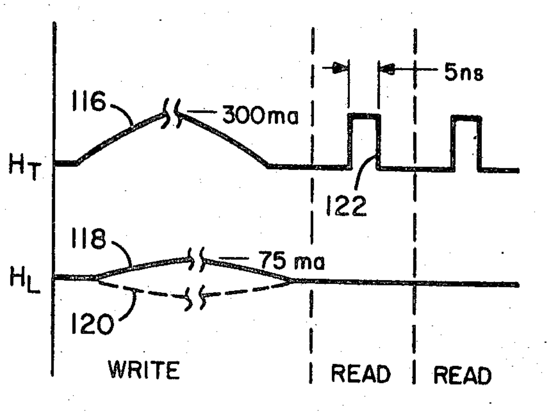
FIG. 16 is an illustration of the control signals associated with the embodiment of FIG. 14.

With particular reference to FIGS. 14, 15 and 16 there is disclosed a fourth preferred embodiment of the present invention. In this embodiment information core 10 is external to the drive circuitry with the elements assembled in a stacked, superposed, sandwiched array with suitable insulators—not illustrated for clarity—therebetween; ground plane 110, readout film 12, common transverse read and write line 112, common longitudinal write line and sense line 114 and information core 10. Cores 10 and 12 are oriented with their easy axes parallel; common transverse read line and write line 112 is oriented with its magnetic axis orthogonal to said easy axes; common longitudinal write line and sense line 114 is oriented with its magnetic axis parallel to said easy axes. As in the embodiment of FIG. 9, an image conductor 112*a* of read line 112 is utilized.

In the arrangement of FIG. 15, lines 112 and 114 generate a resultant magnetic drive field thereabout when coupled by drive signals. Due to the close spacing between line 112 and ground plane 110 the drive field, at the leading edge portion thereof, has a greater density therebetween, as in the area of readout core 12 then in the area of information core 10 due to the resistivity and reluctance of ground plane 110 to the passage of a magnetic flux therethrough. As the drive field continues in duration the resultant drive field "soaks" through ground plane 110 forming a substantially uniform field about lines 112 and 114. Under this condition—along duration drive field—the magnetization of cores 10 and 12 are aligned in an anti-parallel relationship causing each to form a partially closed flux path for the external remanent magnetization of the other. Thus, there is utilized in the write-in operation a long duration drive signal of gently sloping leading and trailing edges to thus reduce the effect of ground plane 110 which tends to distort the generated drive field into having a greater affect upon readout core 12 than information core 10. Conversely, there is utilized in the readout operation a short duration drive signal of abrupt leading and trailing edges so as to take advantage of the distorting affect of ground plane 110 so as to provide a greater density flux in the area of readout core 12 than in information core 10.

For the write-in operation pulse 116 is initially coupled to line 112 followed by the coincident coupling of pulse 118 for the writing of a "1" or pulse 120 for the writing of a "0" to line 114. These coincident write fields interact in the areas of information core 10 and readout core 12 to set the magnetization of information core 10 and readout core 12 into an anti-parallel relationship causing each to form a partially closed flux path for the external remanent magnetization of the other.

For the readout operation pulse 122 is coupled to line 112 which sets up a substantially intense magnetic field in the area of readout core 12—due to the additive effect of the image conductor **112*a*—but an insubstantially intense magnetic field in the area of the information core 10—due to the subtractive effect of the image conductor 112*a*—as described above with respect to the operation of FIG. 9. Consequently, the magnetization of readout core 12 is partially rotated inducing an output signal in sense line 114 whose polarity is indicative of the information state of information core 10 while the magnetization of information core 10 is substantially unaffected thereby. Thus, as in the above described embodiments of FIGS. 4, 9 and 12 there is provided nondestructive readout of the information stored in information core 10 by the temporary alteration of the magnetization of readout core 12**.

Figure 17:
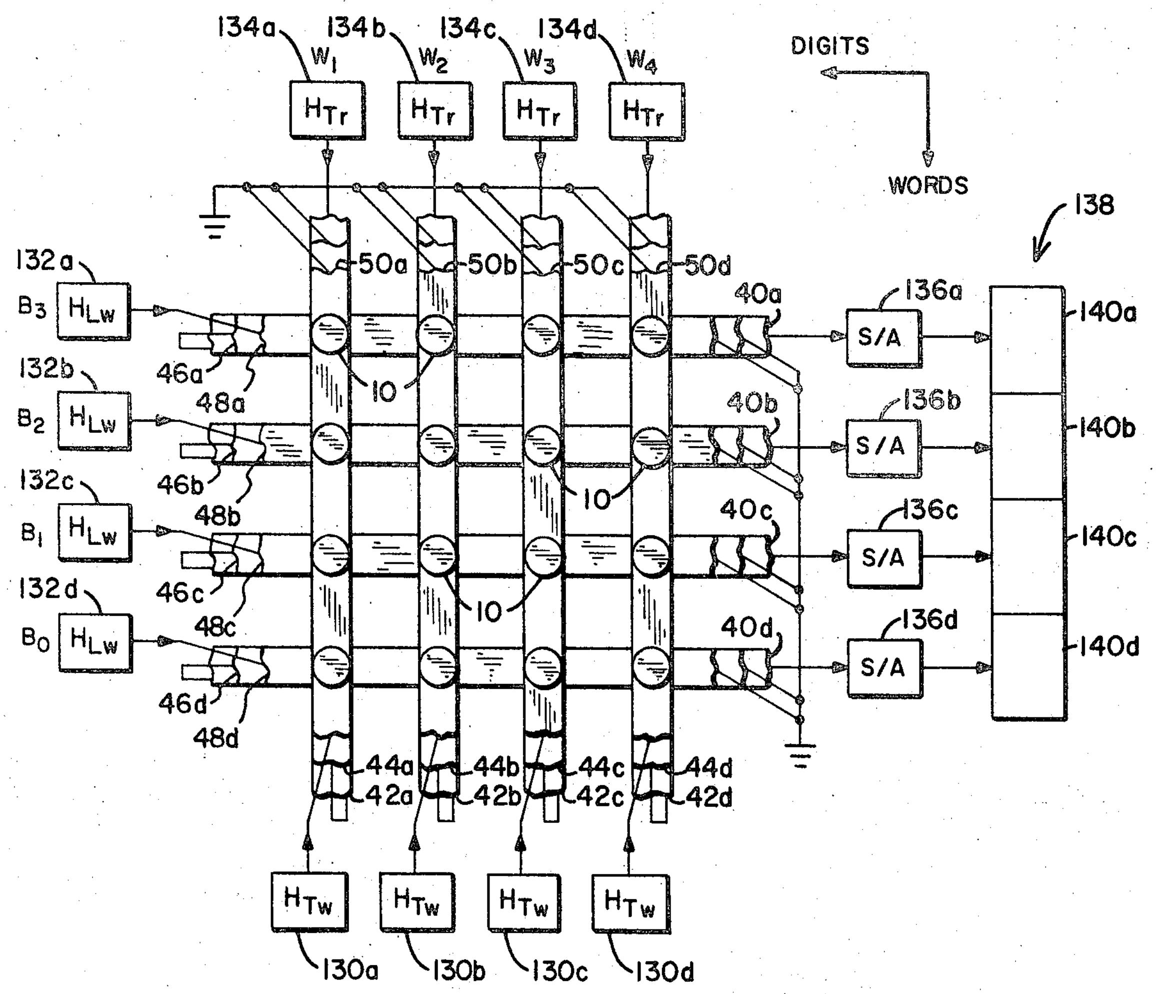
FIG. 17 is an illustration of a four word, four-bit-per-word, word-organized memory array.

With particular reference to FIG. 17 there is illustrated a word-organized memory array consisting of four words, each word of four bits in length. Each bit position consists of a memory device similar to that of FIGS. 3 and 4 and is operated by the control signals of FIG. 5. The four multi-bit words are organized along the vertical columns, or word lines $W_1$–$W_4$, with corresponding bits of each word organized along the horizontal rows, or bit lines $B_3$–$B_6$. The general operation of the system is as follows:

(1) Write-in:

(a) Initially, a transverse write signal $H_{Tw}$ is coupled to the selected word line $W_1$–$W_4$.
(b) Coincidentally, with (a) above, longitudinal write signals $H_{Lw}$ of the proper polarity to write in a "1" or a "0" are coupled to the selected bit lines $B_3$–$B_0$.
(c) The coactions of the resultant fields of a and b above set the magnetizations of the information cores—and correspondingly the readout cores—into the respective "1" or "0" states.

(2) Readout:

(a) A transverse read signal $H_{Tr}$ is coupled to the selected word line causing the magnetization of the readout cores coupled thereto to be temporarily rotated, or displaced, from their alignment along their easy axes. Output signals, the polarities of which are indicative of the information states of the associated information cores, are thereby induced in the bit-oriented sense lines. The sense lines, in turn, couple these output signals to associated sense amplifiers and, perhaps, a temporary storage means such as a register of bistable flip-flops.

Assume for the purpose of illustrating the operation of the memory system of FIG. 17 that the multi-bit binary word 1010—in which the left-most bit is the highest ordered bit and the right-most bit is the lowest ordered bit of the general form of an *n*-bit word $$B_{n-1}B_{n-2}\ldots B_0$$

is to be written into the left-most word line $W_1$ with the highest-ordered bit in bit position $B_3$ and the lowest ordered bit in bit position $B_0$. Initially, transverse write signal source **130*a* couples $H_{TW}$ signal 52 to transverse write line 50*a*. Coincidentally, longitudinal write signal sources 132*a*, 132*b*, 132*c* and 132*d* couple $H_{LW}$ signals 54, 56, 54 and 56, respectively, to longitudinal write lines 48*a*, 48*b*, 48*c* and 48*d***, respectively. The coactions of the resultant fields cause the magnetization of the cores of bit positions $B_3$, $B_2$, $B_1$, $B_0$ to be set into the binary states 1010, respectively, as discussed hereinbefore with respect to the embodiment of FIGS. 3, 4 and 5.

For the subsequent readout operation transverse read signal source **134*a* couples $H_{Tr}$ signal 58 to serially coupled transverse read lines 42*a* and 44*a*. Signal 58 causes the magnetizations of the readout cores 12 at bit positions $B_3$–$B_0$ to be temporarily rotated from their alignment along their easy axes. Output signals, the polarities of which are indicative of the information states of the associated information cores 10, are induced in the associated serially coupled sense lines—such as sense lines 40*a*–46*a* of bit-oriented line $B_3$. The sense lines in turn couple these output signals to associated sense amplifiers 136*a*, 136*b*, 136*c* and 136*d* which may in turn couple their output signals to temporary storage means such as a register 138 of bistable flip-flops 140*a*, 140*b*, 140*c* and 140*d***, respectively.

It is thus apparent that separate and distinct multi-bit binary words may be written into and read out of word lines $W_2$, $W_3$, and $W_4$ in a like manner. Accordingly, there is disclosed a memory system capable of storing a plurality of multi-bit binary words and of reading out such words nondestructively.

It is understood that suitable modifications may be made in the structure as disclosed provided such modifications come within the spirit and scope of the appended claims. Having now, therefore, fully illustrated and described our invention, what we claim to be new and desire to protect by Letters Patent is set forth in the appended claims.

We claim:

1. A magnetic memory element providing nondestructive readout of a magnetizable core, comprising:
An information core;
a readout core;
each of said cores being of approximately the same physical dimensions, material composition and magnetic characteristics and being multi-stable information state, open flux path cores of ferromagnetic material possessing the characteristic of uniaxial anisotropy providing a magnetic easy axis along which each core's remanent magnetization shall reside;
said cores arranged in an inductively coupled relationship with their easy axes aligned;
write-in means for inductively coupling to said cores a write drive field for setting the magnetization of said cores into a parallel selected one of said information states;
set means for inductively coupling to said readout core a set drive field for setting the magnetization of said readout core anti-parallel that of said information core;
readout means for inductively coupling a real drive field to said readout core for causing a nondestructive readout of the information state of said readout core as determined by said one selected information state.

2. The memory element of claim 1 further including a sense means that is inductively coupled to said readout core for sensing the said effect upon the magnetization of said readout core when effected by said readout means for producing an output signal that is indicative of the said one selected information state.

3. The memory element of claim 2 further including a ground plane upon the opposing surfaces of which said information core and said readout core are deposited in a stacked, superposed relationship.

4. The memory element of claim 1 wherein said set drive field is a transverse drive field that in the area of said readout core combines with the external remanent magnetic field of said information to cause the magnetization of said readout core to be biased into an anti-parallel relationship with the magnetization of said information core.

5. The memory element of claim 4 wherein said set drive field is of the same polarity as said readout drive field and is delayed a sufficient delay time D after the write drive field for not permitting the external remanent magnetic fields of said cores to substantially enter said ground plane.

6. A magnetic memory element providing nondestructive readout of a magnetizable core, comprising:

a ground plane;

first and second open flux path type multi-stable-state cores of approximately the same physical dimensions, material composition and magnetic characteristics and being of thin ferromagnetic material having uniaxial anisotropy providing a magnetic easy axis along which each core's remanent magnetization shall reside with said cores disposed in magnetically interacting, superposed relationship with said cores' axes substantially aligned and with each core only partially closing the otherwise open flux path of the other;

said first core deposited upon said ground plane;

write-in means for inductively coupling coincident relatively long duration orthogonal, longitudinal and transverse, write drive fields of gently sloping leading and trailing edges to said cores for causing the magnetization of said cores to be aligned anti-parallel in a selected one of said stable-states;

readout means for inductively coupling a relatively short duration, transverse read drive field of abrupt leading and trailing edges to said cores for causing a substantial effect upon the magnetization of said first core but an insubstantial effect upon the magnetization of said second core; and said write-in means and said readout means sandwiched between said first core and said second core.

7. The memory element of claim 6 further including a sense means that is inductively coupled in said first core for sensing the said substantial affect upon the magnetization of said first core when affected by said readout means for producing an output signal that is indicative of the said one selected stable-state.

8. A word-organized memory array, comprising:

a plurality of magnetic memory elements arranged in a matrix array of word-line columns and bit-line rows with an element at each column-row intersection;

each of said elements comprising;

an information core;

a readout core;

each of said cores being of approximately the same physical dimension, material composition and magnetic characteristics multi-stable-state, open flux path cores of thin ferromagnetic material having single-domain properties capable of providing single-domain rotational switching and possessing the characteristic of uniaxial anisotropy providing a magnetic easy axis along which each core's remanent magnetization shall reside;

said cores arranged in a stacked, superposed relationship with their easy axes aligned;

a separate longitudinal write line magnetically coupled to all the cores of each separate bit-line and having its magnetic axis aligned with said cores' easy axes;

a separate transverse write line magnetically coupled to all the cores of each separate word-line and having its magnetic axis oriented orthogonal to said cores' easy axes;

a separate transverse read line magnetically coupled to all the cores of each separate word-line and having its magnetic axis oriented orthogonal to said cores' easy axes;

a separate sense line magnetically coupled to all the cores of each separate bit-line and having its magnetic axis aligned with said cores' easy axes;

first write means selectively coupling a relatively long duration transverse write signal having gently sloping leading and trailing edges to a selected one of said transverse write lines for causing the magnetization of the coupled cores to be rotated out of alignment with their easy axes;

second write means selectively coupling a first or a second and opposite polarity, relatively long duration, longitudinal write signal having gently sloping leading and trailing edges to all of said longitudinal write lines subsequent to, but overlapping in time, the coupling of said transverse write signal to said selected transverse write line;

the interaction of said overlapping transverse and longitudinal write signals causing the magnetization of said coupled elements' information cores to be set into a selected one of said stable-states as determined by the polarities of said longitudinal write signals;

first read means selectively coupling a transverse read signal to a selected one of said transverse read lines effecting a substantial field intensity in the areas of said coupled elements' readout cores by producing additive fields therein and an insubstantial field intensity in the areas of said coupled elements' information cores by producing subtractive fields therein effecting a substantial rotation only of said readout cores' magnetizations;

said substantial rotation of said readout cores' magnetizations inducing output signals in said coupled sense lines, polarities of which are respectively indicative of the said selected stable-states; and storage means coupled to said sense lines for storing data representative of said selected stable-states.

9. A word-organized memory array, comprising:

a plurality of magnetic memory elements arranged in a matrix array of word-line columns and bit-line rows with an element at each column-row intersection;

each of said elements comprising;

an information core;

a readout core;

each of said cores being of approximately the same physical dimensions, material composition and magnetic characteristics and being multistable, open flux path cores of thin ferromagnetic material having single-domain properties capable of providing single-domain rotational switching and possessing the characteristic of uniaxial anisotropy providing a magnetic easy axis along which the core's remanent magnetization shall reside;

said cores arranged in a stacked, superposed relationship with their easy axes aligned;

a separate longitudinal write line magnetically coupled to all the cores of each separate bit-line and having its magnetic axis aligned with said cores' easy axes;

a separate transverse write line magnetically coupled to all the cores of each separate word-line and having its magnetic axis oriented orthogonal to said cores' easy axes;

a separate transverse read line magnetically coupled to all the cores of each separate word-line and having its magnetic axis oriented orthogonal to said cores' easy axes;

a separate sense line magnetically coupled to all the cores of each separate bit-line and having its magnetic axis aligned with said cores' easy axes;

first write means selectively coupling a transverse write signal to a selected one of said transverse write lines for causing the magnetization of the coupled cores to be rotated out of alignment with their easy axes;

second write means selectively coupling a first or a second and opposite polarity longitudinal write signal to all of said longitudinal write lines subsequent to, but overlapping in time, the coupling of said transverse write signal to said selected transverse write line;

the interaction of said overlapping signals causing the magnetization of said coupled elements' information cores to be set into a parallel selected one of said stable-states as determined by the polarities of said longitudinal write signals;

set means selectively coupling a transverse set signal to all of said transverse write lines subsequent to the cessation of said transverse write signal;

said transverse set signal and the external remanent magnetization of said information core interacting in the area of said readout core to cause said readout core's magnetization to become aligned anti-parallel that of said information core;

first read means selectively coupling a transverse read signal to a selected one of said transverse read lines effecting a substantial field intensity in the areas of said coupled elements' readout cores and an insubstantial field intensity in the areas of said coupled elements' information cores effecting a substantial rotation only of said readout cores' magnetizations;

said substantial rotation of said readout cores' magnetizations inducing output signals in said coupled sense lines the polarities of which are respectively indicative of the said selected stable-states; and storage means coupled to said sense lines for storing data representative of said selected stable-states.

References Cited

UNITED STATES PATENTS

| | | | |
|---|---|---|---|
| 3,179,928 | 4/1965 | Sorensen | 340—174 |
| 3,193,806 | 7/1965 | Pohm et al. | 340—174 |
| 3,188,613 | 6/1965 | Fedde | 340—174 |
| 3,195,108 | 7/1965 | Franck | 340—174X |

STANLEY M. URYNOWICZ, Jr., Primary Examiner

UNITED STATES PATENT OFFICE
CERTIFICATE OF CORRECTION

Patent No. 3,564,516 Dated February 16, 1971

Inventor(s) Frank R. Janisch et al.

It is certified that error appears in the above-identified paten and that said Letters Patent are hereby corrected as shown below:

Column 12, line 62, "real" should read -- read --. Column 13, line 42, "in" should read -- to --. Column 14, 1 33, after "lines," insert -- the --; lines 46 and 47, "multi-stable," should read -- multi-stable-state, --.

Signed and sealed this 20th day of July 1971.

(SEAL)
Attest:

EDWARD M.FLETCHER,JR.
Attesting Officer

WILLIAM E. SCHUYLER,
Commissioner of Paten